UNITED STATES PATENT OFFICE.

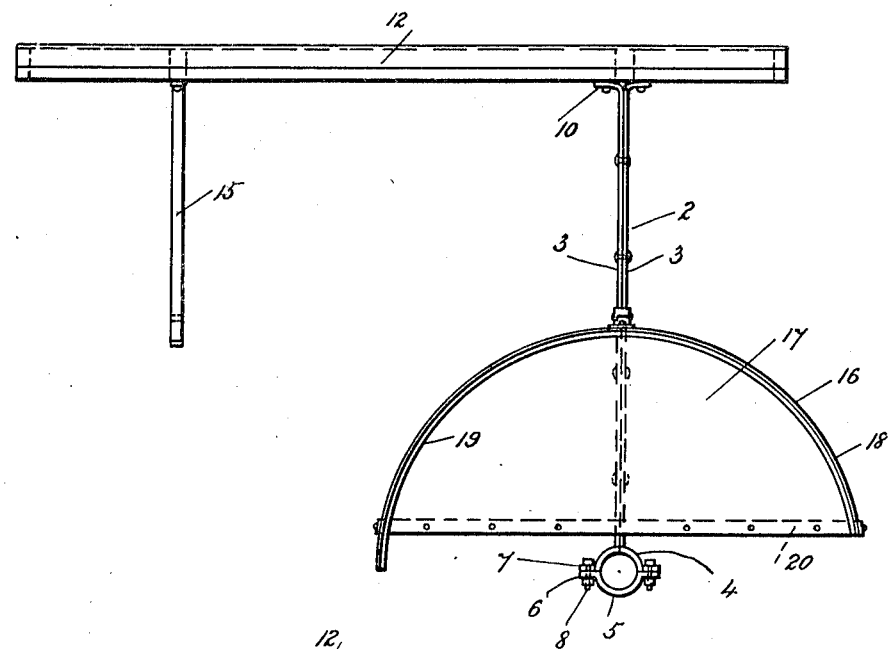
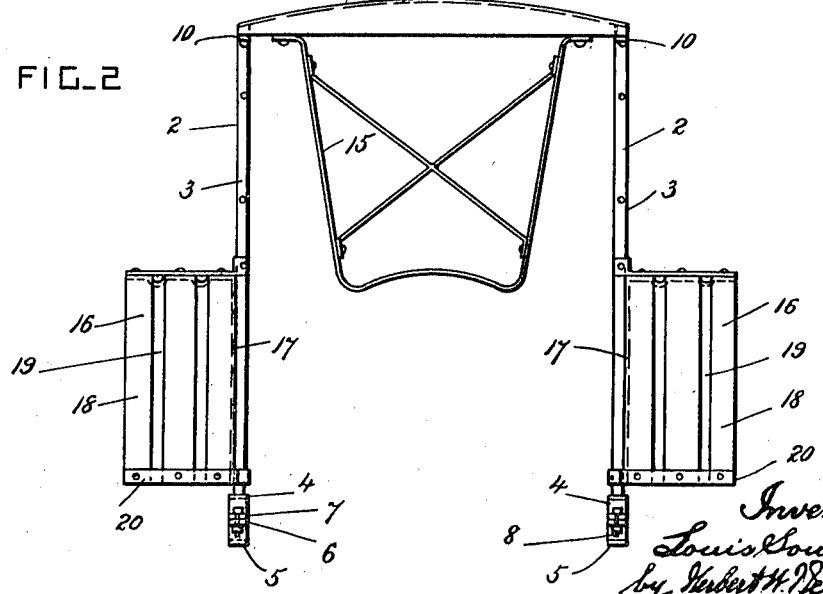

LOUIS SOUCHEK, OF HOLYROOD, KANSAS.

SHIELD FOR TRACTORS.

1,314,225.     Specification of Letters Patent.     Patented Aug. 26, 1919.

Application filed March 22, 1919. Serial No. 284,254.

*To all whom it may concern:*

Be it known that I, LOUIS SOUCHEK, a citizen of the United States, residing at Holyrood, in the county of Ellsworth and State of Kansas, have invented certain new and useful Improvements in Shields for Tractors, of which the following is a specification.

This invention relates to shields for preserving the working parts of tractors from the effects of the weather, and also for sheltering the driver from rain and sun; and it consists in the novel construction and combination of the parts hereinafter fully described and claimed.

In the drawings, Figure 1 is a side view of a shield constructed according to this invention. Fig. 2 is an end view of the same.

This shield is applicable to tractors of any approved construction provided with an axle and ground wheels on the ends thereof. In carrying out this invention two similar uprights 2 are provided, each consisting of two flat metallic bars 3 secured face to face. Each bar 3 has a curved portion 4 at its lower end, and 5 is a semicircular bar having flanges 6 at its ends which are secured to flanges 7 on the curved portions 4 by bolts 8. The parts 4 and 5 are arranged in circular form, and the bolts 8 not only secure them together but afford a means for clamping the uprights to the axle bearings of the tractor. The bars 3 have horizontal portions 10 at their upper ends formed by bending their upper parts in opposite directions, and 12 is a top or canopy which is secured to the said portions 10.

This canopy is rectangular in form, and it is made of a size sufficient to extend over the whole of the tractor. The canopy is formed of a framework of bars, and a curved top plate or plates secured to the framework and adapted to shed the rain at the sides of the tractor.

A light frame or brace 15 is provided at the front end of the top or canopy, and its lower end is secured to any convenient front portion of the tractor, such as the radiator. This frame is formed of any suitable arrangement of small bars or rods which will not obstruct the view of the operator.

Each upright has a wheel guard 16 secured to it, and these wheel guards are adapted to extend over the ground wheels of the tractor. Each wheel guard has a flat segment-shaped plate 17 which is arranged vertically and has its middle part secured to the lower part of the upright above the clamping device. Each wheel guard also has a curved plate 18 secured to the peripheral portion of the segment, and adapted to extend laterally therefrom over the adjacent ground wheel. The curved plate 18 is provided with corrugations 19 to stiffen it, and 20 is a bar secured to the bottom edge of the plate 17, and extending across the end portions of the curved plates 18 to strengthen and stiffen these parts. The two wheel guards and the top or canopy are supported mainly by the two uprights 2, the front end only of the top being partially supported or braced by the frame 15, which can be fitted in place after the uprights have been secured to the axle bearings so as to hold the top or canopy and the wheel guards in the desired positions. Additional braces can be attached at various points to connect the device with other stationary parts of the tractor if found necessary.

What I claim is:

1. A shield for a tractor, comprising two similar uprights having clamping devices on their lower ends, a top or canopy secured to the tops of the uprights, a frame or brace attached to the front end of the top or canopy, and two ground wheel guards formed of curved plates adapted to extend over the wheels and segment-shaped flat plates secured to the curved plates and having their middle parts fastened against the lower portions of the uprights.

2. A shield for a tractor, comprising two similar uprights having clamping devices on their lower ends, each said upright being formed of two flat bars secured face to face and having their end portions spread apart, a top or canopy secured to the tops of the uprights, a frame or brace attached to the front end of the top or canopy, and two ground wheel guards formed of curved plates adapted to extend over the ground wheels of the tractor and segment-shaped flat plates secured to the curved plates and having their middle parts fastened against the lower portions of the uprights.

In testimony whereof I have affixed my signature.

LOUIS SOUCHEK.